United States Patent [19]

Kapland et al.

[11] Patent Number: 4,539,121

[45] Date of Patent: Sep. 3, 1985

[54] BAY MUD STABILIZATION

[76] Inventors: Mitchell A. Kapland, 3000 Friends Rd., Annapolis, Md. 21401; Melville W. Robinson, Jr., 338 River Rd., Beaver, Pa. 15009

[21] Appl. No.: 571,801

[22] Filed: Jan. 18, 1984

[51] Int. Cl.³ .............................................. C02F 11/14
[52] U.S. Cl. .................................. 210/751; 106/117; 106/120
[58] Field of Search ............... 210/609, 710, 727, 751, 210/702, 725; 106/117, 118, 120

[56] References Cited

U.S. PATENT DOCUMENTS

| | | |
|---|---|---|
| 3,920,795 | 11/1975 | Selmeczi et al. ..................... 106/109 |
| 3,975,266 | 8/1976 | Balze .................................... 210/710 |
| 3,977,971 | 8/1976 | Quinn et al. ......................... 210/738 |
| 4,015,997 | 4/1977 | Selmeczi et al. ..................... 106/117 |
| 4,110,212 | 8/1978 | Krofchak ............................. 210/726 |
| 4,124,405 | 11/1978 | Quienot ................................ 210/751 |
| 4,129,449 | 12/1978 | Kojima ................................. 106/95 |
| 4,394,176 | 7/1983 | Loggers ............................... 106/120 |
| 4,465,518 | 8/1984 | Miyoshi et al. ...................... 106/117 |

*Primary Examiner*—Peter Hruskoci

[57] ABSTRACT

Aqueous bay mud sludges, such as dredgings, are converted into load supportive masses by partially dewatering the sludge, which contains solid particles of clay, shell and organic matter, to a solids content of about 15 to 50 weight percent and adding thereto, between 5 to 30 percent by weight, based on solids, of a ground granulated blast furnace slag. Upon settling, the mixture will stabilize to provide a sedentary mass.

1 Claim, No Drawings

BAY MUD STABILIZATION

BACKGROUND OF THE INVENTION

The dredging of harbors or other bodies of water for the purposes of deepening the channels to improve navigation or for the installation of large pipes or tunnels, requires that large quantities of accumulated slimy sludges or bay muds must be removed. These bay mud sludges contain very finely divided suspended solids that are difficult to separate from the aqueous suspensions and solidify. Such bay mud sludges, because of the finely divided physical state of the components such as clays, shells, and organic matter, are not usable as a landfill material because of their poor load supportive properties.

The mere settling of such sludges, even over an extended period of time, still does not provide a stable media.

The use of water quenched blast furnace slag in the solidification of some specific sludges has previously been proposed. In U.S. Pat. No. 3,920,795, for example, the addition of a granulated blast furnace slag, in an amount of between 1–20 percent, based on the solids content of a slurry, was made to aqueous calcium-containing inorganic sludges containing calcium sulfates and calcium sulfites, such as those resulting from sulfur dioxide removal from power plant combustion gases. Also, in U.S. Pat. No. 4,015,997, the addition of a granulated blast furnace slag, in an amount of between 2–50 percent, based on the solids content of a slurry, was made to aqueous coal processing sludges in a process for stabilizing the solids content thereof.

We have now discovered that a granulated blast furnace slag, when added to a basified slurry of bay mud sludge will stabilize the solids content thereof sufficient to provide load supportive properties.

It is an object of the present invention to provide a process for the stabilization of the solids content of bay mud sludges to convert the solids content thereof into a sedentary mass which evidences load supportive properties to an extent that they are usable as a load bearing landfill.

It is another object of the present invention to produce sedentary, load supportive masses from bay mud sludges which are far less prone to any effects to leaching, thus resulting in a decreased amount of contamination of ground water by soluble constituents in the resultant solidified and stabilized landfill.

SUMMARY OF THE INVENTION

Aqueous bay mud sludges, such as dredgings, containing finely divided solid particles of clay, shell and organic matter, are converted to sedentary load supportive masses by partially dewatering the sludges to a solids content of between 15 to 50 percent by weight, admixing therewith between 5 to 30 percent by weight, based on the solids content of the partially dewatered sludge, of ground, granulated blast furnace slag, and maintaining the mixture in a substantially quiescent state to effect stabilization of the sludge solids and produce a sedentary mass having load supportive properties. Preferably, the mixture is basified with lime and the ground, granulated blast furnace slag is of a particle size having a Blaine value between 1800–6000 sq. cm. per gram.

DETAILED DESCRIPTION

The present invention provides a method for stabilizing the solids content of bay mud sludges to the extent that the sludges are usuable as a load supportive and leach-resistant land mass.

Bay mud sludges, as defined herein, includes dredgings from bays, rivers, creeks, swamps and ponds which contain predominately clays, shells and organic matter. As an example of such sludges, the dredgings from the Sea Girt area of Baltimore Harbor was analyzed as to solids content and gave a mineral analysis as follows:

| Mineral Analysis | Weight Percent (dry) |
|---|---|
| Silica, $SiO_2$ | 59.95 |
| Alumina $Al_2O_3$ | 14.32 |
| Iron, $Fe_2O_3$ | 6.05 |
| Potassium, $K_2O$ | 1.85 |
| Sulfur, $SO_3$ | 1.46 |
| Sodium $Na_2O$ | 1.37 |
| Titania, $TiO_2$ | 0.99 |
| Magnesia, $MgO$ | 0.97 |
| Lime, $CaO$ | 0.25 |
| Phosphorous $P_2O_5$ | 0.05 |

With a loss on ignition value (1100° C.) of 12.40 percent.

As another example of such a bay mud, the dredgings from the Fort McHenry region of Baltimore Harbor were analyzed as to solids content and gave a mineral analysis as follows:

| Mineral Analysis | Weight Percent (dry) |
|---|---|
| Silica $SiO_2$ | 54.83 |
| Alumina, $Al_2O_3$ | 17.33 |
| Iron, $Fe_2O_3$ | 6.31 |
| Sulfur, $SO_3$ | 3.76 |
| Potassium, $K_2O$ | 2.45 |
| Magnesia, $MgO$ | 1.55 |
| Sodium, $Na_2O$ | 1.42 |
| Titania, $TiO_2$ | 1.10 |
| Lime, $CaO$ | 0.62 |
| Phosphorous, $P_2O_5$ | 0.16 |

With a loss on ignition value (1100° C.) of 10.04 percent.

As can be seen by the above mineral analyses, the bay mud solids content is predominately (>75%) silica, alumina, and iron, with minor amounts of other minerals and in excess of nine percent of constituents that are lost on ignition at about 1100° C., which constituents may comprise water of hydration of various compounds therein with alumina, iron, calcium and magnesium, and the like, and decomposition products giving gases such as carbon dioxide, and the like.

These aqueous dredgings are initially low in solids content and are dewatered for treatment in accordance with the present process. For example, the sludge as it is dredged up may contain, due to dilution from the dredging operation, only about two percent to fifteen percent solids. The dredgings are then placed into a pond and allowed to settle, or the dredgings may be treated by mechanical settling means, to increase the solids content to a value of 15 to 50 percent solids. In some instances, chemical flocculants, polymeric materials such as synthetic organic water soluble polyelectrolytes, may be added to the dredgings to effect coagulation and flocculation of small solid particles into large particles to increase the settling rate. Even with such natural settling, mechanical settling, or chemical settling, the resultant sludge still remains in a soft, unstable condition and will not attain sufficient bearing strength to be usable as a load bearing material or as a landfill. One reason for such an unstable condition is due to the very small particle size of the solids in the sludges, with a substantial portion of the solids being less than 10 microns in size. The sludges for use in the present process should thus be dewatered to the extent that the sludge to be treated contains between about 15 to 50 percent solids.

After partial dewatering of the sludges, there is added between about 5–30 percent by weight, based on the weight of the solids, of finely ground granulated blast furnace slag. The granulated blast furnace slag, as discussed in U.S. Pat. No. 3,920,795 may vary somewhat in a specific composition, but contains predominately calcium, silica and alumina constituents, and generally will have an analysis in the following percentages: $SiO_2$ (30–40 percent); CaO (40–50 percent); $Al_2O_3$ (10–20 percent); MgO (3–10 percent); S (1–3 percent); MnO (0.3–3 percent); $Fe_2O_3$ (0.3 percent) and a trace of phosphorous, identified as chemical compositions rather than the compounds contained therein.

The granulated blast furnace slag should be ground to a particle size having a Blaine specific surface of about 1800–6000 sq. cm./gr., preferably between 3000–5000 sq. cm./gr., which provides sufficient contact between the added slag and the finely divided solid particles in the sludge.

With the addition of the granulated blast furnace slag to the partially dewatered sludge, the mixture should be basified, such as by the addition of lime. Preferably, the basification of the mixture is to a pH of between 10.5 to 12.5, with a pH of about 11.0 being most preferred. The mixture is then deposited and held as a sedentary mass while the sludge solids content stabilizes and solidifies to an extent where the same will provide load supportive properties.

The present process is further illustrated by the following examples.

EXAMPLE I

A supply of bay mud, from Sea Girt, having an analysis as described hereinbefore, which was partially dewatered to provide a solids content of 28% by weight, was mixed together with finely divided granulated blast furnace slag. The slag was added in an amount of 15 pounds (dry basis) per 100 pounds of solids in the sludge (dry basis), and had a ground particle size of 4200 sq. cm./gr. Hydrated lime, in an amount of about 3.6 percent, based on the weight of solids in the sludge, was added to the mixture to adjust the pH to a value of 11. The mixture was then placed in a covered plastic beaker and stored at 72° F. and 100% humidity. The degree of sedentation of the sludge solids was measured with a Model CL700 soil test penetrometer over a period of time to determine stabilization. At the end of 30 days, the penetrometer test showed a reading of 1.6 tons per square foot for the solidified mass.

Without addition of the granulated blast furnace slag, such as sludge, after 30 days of settling did not stabilize to an extent which would provide a reading on the penetrometer, i.e., a value of less than 0.15 tons per square feet.

EXAMPLE II

The procedure of Example I was repeated, except that the amount of granulated blast furnace slag added was 17.5 percent by weight based on the weight of the solids in the sludge. At the end of 31 days, the penetrometer showed a reading of 2.5 tons per square foot for the solidified mass.

EXAMPLE III

The procedure of Example I was repeated except that the amount of granulated blast furnace slag added was 12.5 percent by weight, based on the weight of the solids in the sludge. At the end of 31 days, the penetrometer showed a reading of 1.2 tons per square foot for the solidified mass.

EXAMPLE IV

The procedure of Example I was repeated and the penetrometer reading and Darcy's permeability coefficient determined on the solidified mass after 22 days time. The penetrometer reading was 1.6 tons per square foot. The permeability of water through the mass was determined and a series of readings taken were all between $1.9 \times 10^{-6}$ cm2/sec. and $2.3 \times 10^{-6}$ cm2/sec.

As can be seen by the above examples, the bay mud sludge treated according to the present process, evidenced substantial stabilization and resistance to permeability, while the untreated sludge remained in an unstable condition.

What is claimed is:

1. A process for converting aqueous bay mud sludge into a sedentary mass having load supportive properties, and low water permeability characteristics consisting essentially of
   (a) partially dewatering bay mud sludge containing about 2–15 weight percent solids to a solids content of between 15 to 50 percent by weight, said solids comprising, in combination, greater than about 75 weight percent silica, alumina and iron;
   (b) admixing with said partially dewatered sludge of (a) between 5 to 30 percent by weight, based on the solids content of said partially dewatered sludge, of finely ground granulated blast furnace slag comprising 30–40 percent $SiO_2$, 40–45 percent CaO, 10–20 percent $Al_2O_3$, 3–10 percent MgO, 1–3 percent S, 0.3–3 percent MnO, 0.3% $Fe_2O_3$ and a trace of phosphorous, said finely ground granulated blast furnace slag having a Blaine particle size of about 1,800–6,000 sq.cm./g;
   (c) basifying the mixture from (b) with lime to a pH between 10.5 and 12.5 and
   (d) maintaining the basified mixture from (c) in a substantially quiescent state for a period of time sufficient to effect stabilization of said sludge so as to produce a sedentary mass having load supportive properties ranging from 1.2–2.5 tons per square foot and a water permeability ranging from $1.9 \times 10^{-6}$ cm2/sec to $2.3 \times 10^{-6}$ cm2/sec.

* * * * *

UNITED STATES PATENT AND TRADEMARK OFFICE
CERTIFICATE OF CORRECTION

PATENT NO. : 4,539,121

DATED : September 3, 1985

INVENTOR(S) : KAPLAND et al

It is certified that error appears in the above-identified patent and that said Letters Patent is hereby corrected as shown below:

In the Heading:

After the Inventors' names, insert --

[73] Assignee: Trident Engineering Associates, Inc. --

Signed and Sealed this

Tenth Day of March, 1987

*Attest:*

DONALD J. QUIGG

*Attesting Officer*    *Commissioner of Patents and Trademarks*